United States Patent [19]

Harris, Jr. et al.

[11] 4,048,625
[45] Sept. 13, 1977

[54] BUFFERED PRINT CONTROL SYSTEM USING FIFO MEMORY

[75] Inventors: Samuel C. Harris, Jr.; William A. Surber, both of Waynesboro, Va.

[73] Assignee: General Electric Company, Waynesboro, Va.

[21] Appl. No.: 683,417

[22] Filed: May 5, 1976

[51] Int. Cl.$^2$ .......................... G06F 3/12; G11C 9/00
[52] U.S. Cl. ................................................ 364/900
[58] Field of Search .................. 340/172.5; 197/1 R; 101/1

[56] References Cited

U.S. PATENT DOCUMENTS

| | | | |
|---|---|---|---|
| 3,716,841 | 2/1973 | Jones | 340/172.5 |
| 3,744,033 | 6/1973 | Boyd | 340/172.5 |
| 3,803,558 | 4/1974 | Jones et al. | 340/172.5 |
| 3,911,407 | 10/1975 | Greek, Jr. et al. | 340/172.5 |
| 3,973,487 | 8/1976 | Mahoney | 340/172.5 X |
| 3,990,559 | 11/1976 | Martin et al. | 340/172.5 X |

Primary Examiner—Melvin B. Chapnick
Attorney, Agent, or Firm—Michael Masnik

[57] ABSTRACT

Print control apparatus which combines a first in - first out memory for storing received data with a random access memory for feeding data to a movable type printer to eliminate the need for suspension of receiving input characters or the adding of fill characters or time delays during the period when printer action is suspended during execution of control actions, such as paper feed. The apparatus controls the transfer of data from the first in - first out memory to the random access memory by keeping the latter memory continuously replenished with data as the printer executes its printing action and printed characters are erased from the random access memory.

12 Claims, 4 Drawing Figures

BUFFERED PRINT CONTROL SYSTEM USING FIFO MEMORY

BACKGROUND OF THE INVENTION

The present invention relates to improvements in printing systems. More particularly this invention relates to a system for enabling the execution of control functions related to printing with a minimum of adverse effect on the printing process.

Systems exist which control the printing of information received from a transmission line. The printing system recognizes the coincidence of input characters received from the transmission line or data source and the instantaneous column position of printing or type characters to enable the concurrent printout of a plurality of information corresponding to the input characters at the proper position on a print line. Such printing systems utilize storage units for storing the input characters until the comparison with print characters can be made. If for some reason printout is delayed and input information is not accordingly delayed, the storage unit capacity is soon reached and data is lost. Such a problem is presented at the end of each print line when the line change operation takes place. Line change takes a finite amount of time and printing must cease during this time. One procedure for accommodating the line feed data in printing is to program the transmission line from which data is received to supply fill characters. That is, characters which are not to be printed and therefore not to be stored in the print character memory are provided to take up time for the line feed operation to take place. Fill characters therefore are intended to delay the intelligence being transmitted so that no intelligence is lost during the line feed operation.

The difficulty with using fill characters to accommodate line feed is that additional source programming is necessary to provide the remote source of information with as many fill characters as are needed. In addition, fill characters contain no intelligence and only serve to take up transmission time resulting in less efficient transmission of intelligence. Also because fill characters are being transmitted when line change is taking place, no subsequent line information may be put into the memory and printer throughout, i.e. the rate of printing intelligence, is reduced.

FEATURES OF THE INVENTION

It is accordingly an object of the present invention to accommodate control functions related to printing which do not rely on fill characters to accommodate the execution of the control functions.

Another object of the present invention is to provide an improved printer control system for controlling printing before and after the execution of a control function.

Another object of the present invention is to provide a control system for recognizing and selectively controlling characters to be printed at the end of one print line and those to be printed at the beginning of a subsequent print line.

It is a further object of this invention to eliminate the need for suspension of receiving input characters or the adding of fill characters or time delays during a machine action which reduces or suspends printing or occupies time.

It is another object of this invention to increase the throughput of printers.

Another object of this invention is to combine a FIFO, a first in-first out, memory with a random access memory, such as a circulating memory in printers to increase the throughput of data.

It is a further object of this invention to provide an improved input data processing arrangement for use in printing operations.

In accordance with one embodiment of the present invention there is provided a source of input characters available at a first character rate wherein the characters comprise printable and control characters. A circulating memory is provided having a given plural printable character capacity. Means including said circulating memory are employed for causing printable input characters to be printed along a line on a record medium in the order in which they are received from the source. In order to overcome the limitations arising when the last named means is unable to print input characters available at said data rate after receipt of a given plurality of time consuming control characters, there is provided a plural character capacity FIFO memory. Means are provided for applying the input characters from said source to said FIFO memory for storage serially therein in the order in which such characters are received from the source. Means are provided for applying only the printable input characters from said FIFO memory to said circulating memory. The received input characters are analyzed to detect a control character. The application of input characters from said FIFO memory to said circulating memory is suspended in response to detection of said control character. The characters circulating in said circulating memory are detected to determine the absence of printable characters whereupon the execution of said detected control character is permitted to take place. Finally, means are provided responsive to the execution of said control character to re-enable application of input characters from said FIFO memory to said circulating memory.

A complete understanding of the invention and a fuller appreciation of its objects and features will be available from the following detailed description which is made in conjunction with the drawings of a particular illustrative embodiment.

BRIEF DESCRIPTION OF THE DRAWINGS

FIG. 1 shows a print selection and control system for a printer such as for example described in detail in U.S. Pat. No. 3,803,558 dated Apr. 9, 1974 and U.S. Pat. No. 3,716,841 dated Feb. 13, 1973 issued to the assignee of the present invention. FIG. 1 of the present application represents a simplication of FIGS. 1 of the aforementioned patents. Essentially, data representing printable and non-printable or control characters is available from source 1 in bit serial character serial form. This data is converted to character serial bit parallel form in circuit 2 before application through decoder 3 to print memory 4 and the printer control 5. In one particular embodiment the print memory 3 constituted a recirculating memory or shift register which receives input characters from circuit 2 in the form of a numerical representation of each character to be printed. The memory 3 receives and stores the printable input characters from decoder 3 for printing by printer 6. Printer control 5 receives the control characters from 3 for executing the control functions such as line feed, motor on-off, carriage return, bell, form feed, etc.

Figure 1:
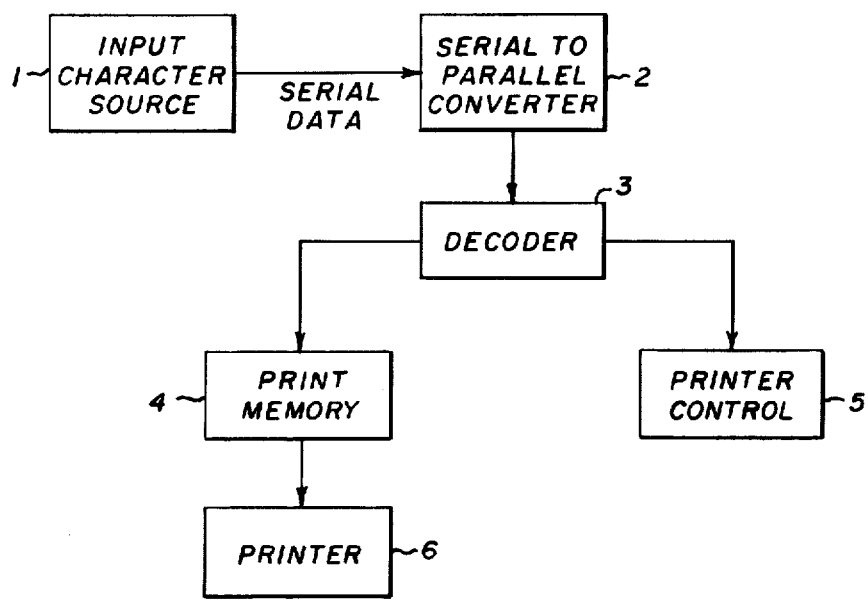
FIG. 1 identifies in a simplified block diagram form a prior art printing arrangement.
Figure 2:
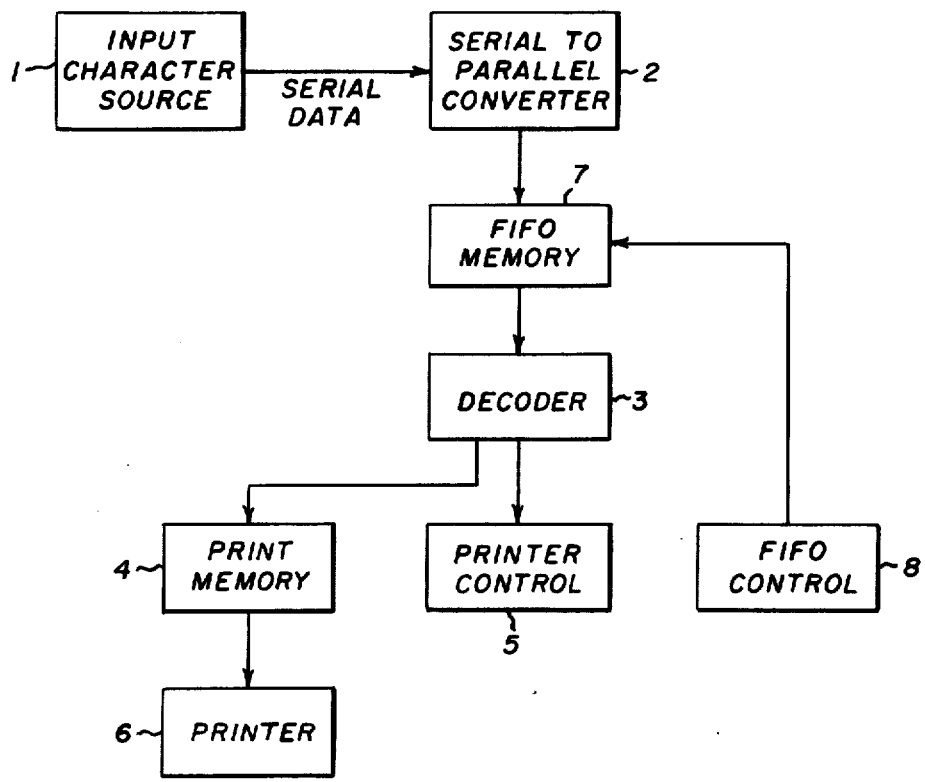
FIG. 2 illustrates in simplified block diagram form the use of a FIFO memory in the arrangement of FIG. 1 for eliminating the need for fill characters thus improving the throughput of the printer.

A system must be provided for coordinating the printing action with the control functions. A system for controlling printing during the transition period between the execution of a control function, such as ending one line of printing and beginning the next line of printing is shown in FIG. 2 of U.S. Pat. No. 3,716,841. In this patent it is shown that input characters received after the line feed command are inhibited from being printed until the old line or print has been completed and line change or feed has occurred. In addition, line feed is delayed until all the character commands stored in memory, prior to the line command, have been printed on the old line. Thus the memory is examined to determine how long line feed must be delayed and which characters are to be printed on the old line.

In the prior art arrangement fill characters or time delays are required to allow time for paper movements or execution of other control functions and the processing of printable characters received before the line feed signal. In one application a character may have to wait in print memory as long as one font period or approximately 200 milliseconds to be printed. This means the time delay necessary for paper movement in 238 milliseconds plus the movement time. Hence, several non-data or fill characters have to be processed with each line at the character input rate of 30 characters per second.

FIG. 2 identifies in simplified block diagram form the use of a FIFO memory to overcome the need for fill characters. A FIFO memory, such as, for example, the Quad 64 Type 3341 made by Fairchild Semiconductor Components Group, Fairchild Camera and Instrument Corporation receives data and stores it serially in the order in which it is received and delivers the stored data in the order of first in, first out. Briefly speaking, the data bits in parallel form are inserted into the print memory as a memory hole or vacancy is detected. The data from the source is identified by decoder 3 as comprising control codes such as line feed, vertical tab, form feed, motor on, motor off, etc. If a line feed code is detected, this information is stored in 5 as will be discussed shortly, until printable characters received before the line feed in the print memory are processed. Characters received after the line feed may be lost unless a time delay or fill characters are inserted after the line feed. Instead of being directly inserted into the print memory 4, the data is collected in a first in, first out register (FIFO) to await a print memory hole or vacancy in 4. The decoder 3 is coupled to the output of the FIFO memory 7 to allow concurrent decoding and printing. The input to the FIFO 7 is at the received data rate. The output rate of the printer 6 is limited by the printing rate and the capacity of the terminal to process data. It is desirable that the printing rate be considerably faster than the input data rate in order to minimize the sequence character capacity of the FIFO.

Data is held at the output of the FIFO under control of circuit 8 until a memory hole is detected in 4 at which time it is inserted for printing unless it is a control code such as a paper moving code. If the control code is a line feed, vertical tab or form feed code and paper action is in process, the FIFO output is held under control of 8 until the printer line feed has been executed. Data can be read out of the FIFO as fast as it can be compared by the printer algorithm. Comparison rate is determined by the belt access time which may vary from 96 microseconds to the full font period of 230 milliseconds with an average of 115 milliseconds.

Since the average time necessary to print characters on short lines (less than eight characters) is less than 230 milliseconds, the backlog of characters received during paper control actions can be cleared very fast. The following formula derives a number of lines that can be sustained without fill characters as a function of printable characters per line and FIFO capacity:

$$N = \frac{B}{R\frac{FC}{C+1} + L - C - 2}$$

where
$C$ = characters per line
$R$ = received data rate
$F$ = font period (the time required for one full set of type to pass a given point)
$B$ = FIFO buffer capacity
and
$N$ = number of lines sustained
$L$ = line feed time In a particular embodiment data was received from source 1 at 30 characters per second, shifted through FIFO 7 substantially immediately and was capable of being printed by 6 at approximately twice the received rate without the use of fill characters.

The FIFO memory was selected to have a capacity of 64 characters and the print memory a capacity of 8 characters. This resulted in the elimination of fill characters and hence a throughput increase for the normal data patterns.

Figure 3:
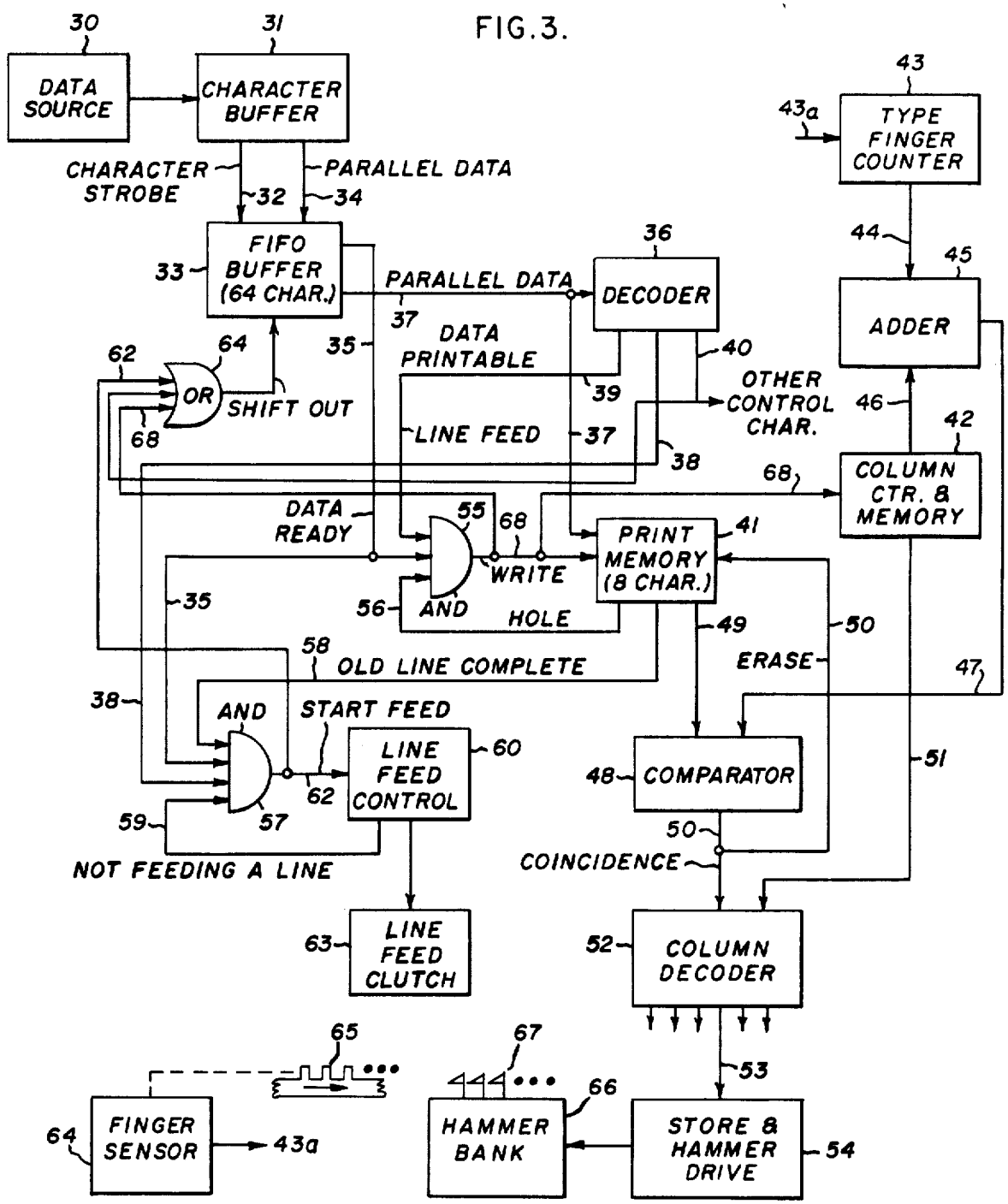
FIG. 3 illustrates in block diagram form the detailed manner in which a FIFO memory is used in carrying out the present invention.

In order to better understand the present invention it may be desirable to discuss briefly one type of printer, as illustrated in FIG. 3, to which the present invention is applicable. The printer is a belt printer in which type bearing fingers mounted on a carrier are effectively moved across the lines on a record medium such as paper. Hammers are selectively actuated to impact the type fingers through an ink ribbon to the paper. Print memory 41 stores a numerical representation of each of the input characters comprising the information which are available from the source 30 through the FIFO buffer 33. Lead 43 provides a write signal in response to the presence of an input character at the output of the FIFO buffer 33 and the availability of a storage capacity at the input position of print memory 41. When an input character is present and memory 41 is free to receive it, the write signal on lead 43 strobes the print memory to receive the character and also a second memory 42 which receives a number from its counter which corresponds to the column in which the input character simultaneously received is to be printed. Another source of information to this type of printer is the finger counter 43 which registers a number corresponding to the printing character or type finger at a reference position along the print line as for example the character adjacent column 1. Thus memory 41 receives and stores the input character information which is desired to be printed, memory 42 stores information indicating where the input information is to be printed and counter 43 stores information indicating where the printing characters are that must be actuated to print out the input character information.

To obtain printout, each number stored in the memory 42 is added in an adder 45 to the number from 43 representing the print character at the print position represented by the value of the column indicating number from memory 42. The series of sums produced by the adder 45 are numbers representing the print characters which can next be printed at the columns indicated by the column number forming a part of each sum. These print character numbers are compared by comparator 48 with the input character number stored in the print memory 41. It is to be noted that the comparison is on a bit by bit basis and is in synchronism with the circulation of memories 42 and 41 such that the sum which was produced by the column position number for the first input character is compared with the first input character number. If the print character approaching the first column has a number which compares with the input character number to be printed in the first column then there is a coincidence of numbers and an output is obtained from comparator 48 on lead 50.

The output of comparator 48 is applied to a column decoder 52 and also back to the print memory 41. The feedback path to print memory 41 enables the input character which resulted in the finding of a printable character to be erased. This enables memory 41 to receive another input character in a space left.

The column decoder 52 receives the coincidence indicating signal from comparator 48. Column decoder 52 also receives seriatim the columns indicating numbers from memory 42 as they are applied to the adder 45. Thus as each computation is being made in the adder and comparator 48, the channel of the column decoder 52 corresponding to the column position number applied to the adder is energized. The print actuation means is shown in FIG. 3 as a block 54 for the column position C40. There is a print actuation column for each of the output channels of column decoder 52, each one being connected to the hammer for the corresponding column. Block 54 represents a storage unit and a hammer device. The memory is provided for each of the columns such that all coincidence indications obtained for one examination of the contents of the print memory 41 will be stored so that for the one position of the print characters all hammers will be simultaneously actuated for all the printable characters located. This simultaneous printout results in random or nonsequential printout within the storage capacity of memories 41 and 42. For further details of the operation of such a partial line printing system reference can be made to the aforementioned U.S. Pat. No. 3,803,558. U.S. Pat. No. 3,716,841 issued to Clifford M. Jones on Feb. 13, 1973 describes a prior art arrangement for inhibiting printing after receipt of a control character signal. U.S. Pat. No, 3,605,613 issued to Seymour M. DePuy et al on Sept. 20, 1971 describes the details of a movable print belt used in such a printing system. U.S. Pat. No. 3,605,610 issued to Earle B. McDowell et al on Sept. 20, 1971 describes in detail type finger detectors and hammer drive circuitry for effecting printing.

Referring to FIG. 3 there is shown in greater detail the manner in which the data transfer from the FIFO to the recirculating print memory is coordinated to achieve the desired results. Referring to FIG. 3, data available in bit serial character serial form is available from a source 30 and applied to the single character buffer 31 operating as a serial to parallel converter. The output of serial to parallel converter is input data in character serial bit parallel form. In a well known manner source 31 also provides a character strobe for application over lead 32 to the FIFO 33 for controlling the entry of data from 31 into 33. The data is available on lead 34 and includes both printable and nonprintable characters. Examples of non-printable or control characters are line feed, form feed, motor on, etc. All of this data both printable and control is stored in the FIFO buffer which in a particular embodiment had a capacity of 64 characters. The data is moved serially through the FIFO buffer to its output in the order in which it is received from the source 30. When data exists at the output stage of buffer 33, a data ready signal is developed on load 35. The actual data in the output stage is applied over lead 37 to the decoder 36. The function of decoder 36 is to provide a signal on lead 39 whenever printable characters are received from the FIFO by the decoder 36 and to indicate on lead 38 that a line feed signal has been decoded by decoder 36. Other control characters such as vertical tab, form feed, etc., may appear on other lines such as that represented, for example, by lead 40. The arrangement thus far provides an arrangement for detecting printable and control characters. The manner in which this is accomplished is well known and forms no part of the present invention. Reference may be made to U.S. Pat. No. 3,934,228 issued to Paul J. Morgan on Jan. 20, 1976 entitled "Parallel Interface With High Speed Printer" for circuitry indicative of how various ASCII control signals may be detected. U.S. Pat. No. 3,739,350 issued to Paul J. Moran on June 12, 1973 and entitled "High Speed Data Processing System" describes the code characteristics of printable and non-printable characters in considerable detail.

Attention will now be given to the manner in which printable characters are caused to be printed. For this purpose there is provided a print memory 41, a column counter and column memory 42. It was mentioned in the aforementioned patents that the memories may comprise a circulating shift register with a capacity of more than one character but less than a full line of characters. In one embodiment for purposes of optimizing cost and performance the character capacity was chosen to be eight. Printable data is applied to the print memory 41 over lead 37. Column counter and memory 42 responds to each printable data coming in to memory 41 to change the count of the column counter by a given increment such as 1 and then store the new column count in its memory. The data entered into print memory 41 and the column information entered into memory 42 are circulated in synchronism. Finger sensor 64 detects, as shown by the dotted line, the passage of printing or type fingers 65 moving relative to reference point and produces signals over lead 43a which cause counter 43 to provide a count descriptive of the instantaneous position of the printing characters with respect to a line on a record medium such as paper. The printing character position signal on lead 44 is applied to the adder 45 where it is algebraically combined with the column information available on lead 46 from the column counter and memory 42. The algebraic sum signal available on lead 47 is applied over lead 49 to the comparator 48 together with the input characters circulating in memory 41. The coincidence signal is provided on lead 50 which indicates that the type fingers appearing at a particular column location correspond to the input characters to be printed at those column positions. The column decoder 52 responds to the coincidence signals available on lead 50 and the column information signals available on lead 51 to provide appropriate signals over the appropriate leads of connection 53 to the hammer drivers used for printing. The hammer drive circuit results in operating electrical signals of sufficient power to actuate selectively the appropriate hammers 67 of the hammer bank 66. Actuation of the hammers causes the type fingers 65 appearing in front of such hammers to be operated and causing printing of the type character represented by such fingers. For further details of such print actuating apparatus, reference may be made to the aforementioned U.S. Pat. No. 3,605,610. Print memory responds to the signal on lead 50 to erase the character being printed in response to the coincidence signal. For a more detailed explanation for the manner in which the print memory, column memory, finger counter, column decoder for hammer driver operate, reference should be made to the aforementioned patents.

The balance of the circuit shown in FIG. 3 is directed to controlling the flow of data from the FIFO buffer to the print memory 41. As previously mentioned, lead 68 to the print memory 41 enabling the input character available on 37 at lead 38 indicates whenever a line feed character had been sensed by 36 as being at the FIFO output stage and lead 39 indicates whenever a printable character has been sensed at the FIFO output stage. It is desirable that only printable characters be applied to print memory 41. The conditions for writing printable characters in a print memory 41 are established by the AND gate 55. AND gate 55 has applied as one input the signal available on lead 39 indicating that a printable character appears at the FIFO output stage, the data ready signal available on lead 35 from the FIFO buffer indicating that a character exists at the FIFO output stage and the signal on lead 56 indicating a vacancy in memory 41. When these three input signals are properly combined by AND gate 55, a writer signal is applied over lead 68 to the print memory 41 enabling the input character available on 37 at that moment to be applied to print memory 41. In this manner printable characters are transferred to print memory 41 from the FIFO buffer.

If a line feed character should appear on lead 38, it is applied as one input to the AND gate 57. AND gate 57 has applied also to its input a signal available on lead 58 indicating that all printable characters in memory 41 have been printed. AND gate 57 also has applied to its input the data ready signal available on lead 35 and a signal on lead 59 indicating that a line feed is not currently being executed, that is, that any previous line feed action is complete. The output of AND gate 57 available on lead 62 initiates the operation of the line feed control 60 by activation of a mechanism such as line feed clutch 63 which causes the paper to move relative to the printing type. As previously mentioned, it is desirable that when a line feed signal is detected and is to be processed, that the FIFO buffer is prevented from supplying further data to the print memory 41. This is achieved by use of the OR gate 64. OR gate 64 has the start feed signal available on lead 62 applied as one input and the memory write signal available on lead 68 applied as another input. Thus, FIFO buffer 33 responds to the output of the OR gate to shift its character content by one character position in response to the write signal for printable characters or the start feed signal for line feed control. Thus any time we process either a printable or a nonprintable character, OR gate 64 operates to remove that character from the FIFO and to advance the next character to its output stage for consideration. The application of data from the FIFO buffer for processing is blocked in response to either a full memory as indicated by the signal available on lead 56 or a line feed being processed available on lead 59.

Summarizing therefore, printable characters are detected, applied to the print memory and processed for printing. When a line feed signal is detected the FIFO buffer is prevented from furnishing further characters at its output stage for printing or control consideration. It should be noted, however, that the FIFO buffer in the present invention having a 64 character storage capacity may continue to receive input characters from source 30 unless it is filled. In normal operation, the filling of the FIFO does not occur, since printing takes place removing characters at a faster rate than they are received from the data source.

In order to insure that the rate at which characters are printed by the printer is greater than the rate of availability of data from the source 30, the character signals from the FIFO memory are presented at its output stage at a substantially higher rate than the output data rate of source 30. Also the capacity of the FIFO memory is dimensioned such that when combined with the capacity of the random access memory 41, sufficient aggregate capacity is provided to accommodate printing interruptions due to control actions and insure that all data from source 30 is processed. To maximize throughput by the printer, when characters in memory 41 have been recognized as being in position to be printed along a line on a record medium, they are immediately removed from memory and replaced with new signals presented by the FIFO memory. In one illustrative embodiment, the random access memory had a capacity of eight characters and the FIFO memory had a capacity of 64 characters. To accommodate such printing interruptions, data which was available from a source 30 at a 30 character per second rate was printed out at a higher rate using the combination of memories indicated and a FIFO data output shift rate of the order of 100,000 characters per second and a circulating random access memory operating to provide one circulation of stored data in one millisecond. The transfer of data from FIFO to the random access memory is thus substantially instantaneous with respect to the processing time of data in such memory.

Figure 4:
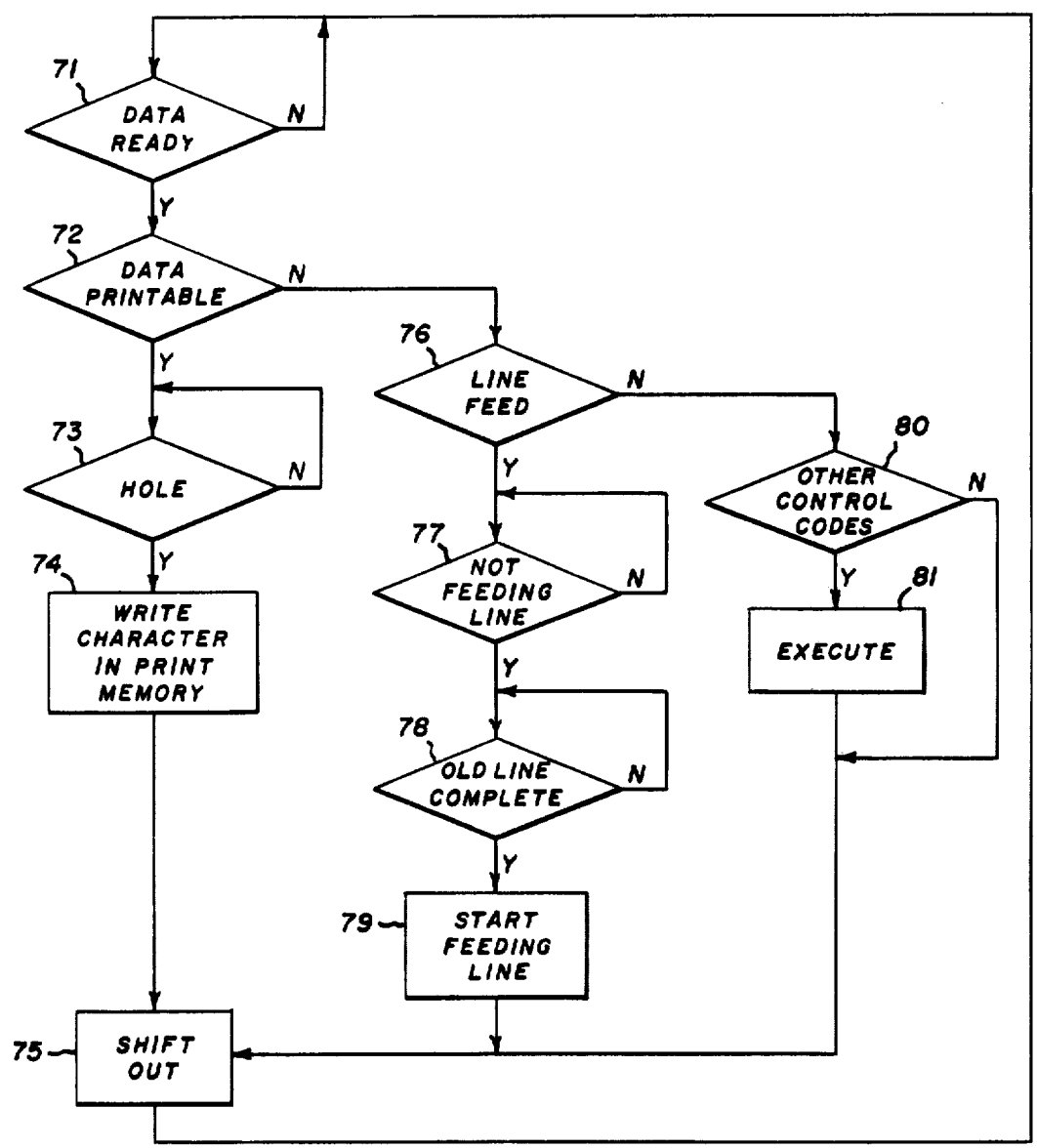
FIG. 4 explains in flow diagram form how the structure of FIG. 3 operates.

Referring to FIG. 4, there is shown a flow diagram useful in explaining how the structure of FIG. 3 operates in response to the data ready from source 30. The flow diagram is of conventional form in that it comprises a series of diamond-shaped blocks which constitute the question being asked and depending upon the yes or no answers, the actions that are taken. The actions taken in response to the yes (Y) or no (N) answers to the questions are represented by the rectangular blocks. Thus, for example, if element 71 receives an affirmative answer to the question whether data is ready then the next question considered as indicated by element 2 is whether the data is a printable character. An affirmative answer would then result in the inquiry, as represented by 73, whether there is a hole in print memory 41, that is, a character vacancy has been recognized. If there is a hole in memory, then element 74 indicates that the character being presented at the output of the FIFO buffer 33 is to be written into print or random access memory 41. Then, as indicated by element 75, the next data is shifted out of the FIFO buffer 33. Returning to element 73, if there is no hole in memory, then testing continues until a hole is detected as occurring in memory. Returning to element 72, if data is determined for example by decoder 36 to be a control character, then element 76 indicates that the question is asked whether the character is a line feed character. If it is a line feed character, then the next question asked as shown by element 77 is whether or not the printer is in process of executing a line feed. If it is not executing a line feed, then as shown by element 78, the question is asked whether the old line is in process of being printed or whether printing has been completed on the old line. If printing is completed on the old line, then an action is taken as shown by element 79 of starting a new line feed and causing a shift out, as represented by element 75, of the next character in the FIFO memory to the output stage thereof. Returning to element 77, if it is determined that the printer is in process of feeding a line, then no further action is taken and testing continues until it has been established that the printer is not feeding a line. Similarly, element 78 indicates that if the old line is still in process of being printed, then testing continues until it has been established that the old line has been fully printed.

Returning to element 76, if it has been established that the data being considered by decoder 36 is neither a printable character nor a line feed, then the question asked, as represented by 80, is whether another control character is being considered. If it has been established that another control character is being considered, then the function represented by said other control character is executed as shown by block 81. Also the shift out of the next character from the FIFO buffer is initiated. If element 80 establishes that the data being considered by the decoder is neither a printable character nor a line feed nor another control function but for example is a null code, then the next character is shifted out of the FIFO buffer as indicated by block 75.

While the invention has been shown in terms on specific components, it is obvious that the invention can be extended to other embodiments. For example, the data format, i.e. serial or parallel, is discretionary, the FIFO capacity and the random access memory capacity may be varied to suit particular needs, such as speed or rate requirements, and the control functions affecting FIFO operation may be other control functions such as those available on lead 40.

While the invention has been described with particular reference to the construction shown in the drawings, it is to be understood that further modifications may be made without departing from the true spirit and scope of the invention, which is defined by the claims appended hereto.

What we claim as new and desire to secure by Letters Patent of the United States is:

1. In a printer having a plurality of printing characters and means for effectively moving said printing characters during printing such that they appear as a sequence of individually different printing characters moving from column to column along a print line, means for receiving input characters at a first rate, said input characters comprising printable and control characters, a FIFO memory for serially storing said received input characters in the order in which they are received, means coupled to said FIFO memory comprising a circulating memory having a character capacity greater than one character but no greater than a full print line of characters, means responsive to printable received characters for producing column signals representing the columns at which said printable input characters are to be printed, means for applying said column signals and said received printable characters to said circulating memory for storage to provide stored signals and for circulating said stored signals in synchronism, means for providing position signals identifying each column change in moving printing character positions, means for comparing said stored signals and said position signals to detect printing characters to be printed, means responsive to said detected printing characters to cause printout of the printing characters in the columns indicated by said column signals, means for analyzing said received control characters to detect a line feed signal, means responsive to said line feed signal to disable application of input characters from said FIFO memory to said circulating memory, means coupled to said comparing means and responsive to said detected printing characters for erasing in said circulating memory the characters being printed so that erased portions of said recirculating memory are available for application of additional characters from said FIFO memory, means responsive to erased portions in said circulating memory for applying received input characters from said FIFO memory for storage in said erased portions, means for detecting the absence of printable characters circulating in said circulating memory to enable the execution of said detected line feed signal, and means responsive to the execution of said line feed signal to re-enable application of input characters from said FIFO memory to said circulating memory.

2. An arrangement for recording characters along lines on a record medium comprising means for receiving input characters from a source at a first rate, said input characters comprising printable and control characters, a FIFO memory for serially storing said received input characters in the order in which they are received, means coupled to said FIFO memory comprising a circulating memory having a character capacity greater than one character but no greater than a full print line of characters, means responsive to received printable characters for producing column signals representing the columns at which said printable input characters are to be printed, means for applying said column signals and said received printable characters to said circulating memory for storage to provide stored signals and for circulating said stored signals in synchronism, means for providing position signals identifying each column change in moving printing character positions, means for comparing said stored signals and said position signals to detect printing characters to be printed, means responsive to said detected printing characters to cause printout of the printing characters in the columns indicated by said column signals, means for anaylzing said received control characters to detect a line feed signal, means responsive to said line feed signal to disable application of input characters from said FIFO memory to said circulating memory, means coupled to said comparing means and responsive to said detected printing characters for erasing in said circulating memory the characters being printed so that erased portions of said circulating memory are available for application of additional characters from said FIFO memory, means responsive to erased portions in said circulating memory for applying received input characters from said FIFO memory for storage in said erased portions, means for detecting the absence of printable characters circulating in said circulating memory to enable to execution of said detected line feed signal, and means responsive to the execution of said line feed signal to re-enable application of input characters from said FIFO memory to said circulating memory.

3. In a printer wherein signals representing graphical characters and control characters are available from a source to said printer for printing along lines on a record medium, a FIFO register for storing a plurality of said signals representing characters available from said source, and for presenting them in the order in which they are available from said source, a circulating register for storing a plurality of signals each representing a character, means for analyzing the signals presented by said FIFO register, means responsive to signals anaylzed only as representing a graphical character for storing said graphical character signals in said circulating register, a movable carrier bearing printing characters, print hammers for providing relative impact of said printing characters and said record medium, normally inactivated control means responsive to graphical character signals stored in said circulating register and the position of said printing characters for becoming activated to operate selected ones of said print hammers, means responsive to signals analyzed as representing a control character for executing the control function represented by said control character, means for normally disabling the presentation of new character signals by said FIFO register output, and means for enabling the presentation of new character signals by said FIFO register comprising said means for analyzing the stored signals presented by said FIFO register.

4. An arrangement according to claim 3 comprising erasing means responsive to activation of said control means to erase those signals stored in said circulating register which were responsive for activation of said control means, and said enabling means comprising said erasing means.

5. An arrangement according to claim 3 comprising indicating means for indicating the execution of said control function, and said enabling means comprising said indicating means.

6. An arrangement according to claim 5 comprising second indicating means for indicating the completion of a printing sequence, and said enabling means comprising said second indicating means.

7. In a printer wherein signals representing graphical characters and control characters are available from a source to said printer for recording along lines on a record medium, a FIFO memory for storing a plurality of said signals representing characters available from said source, and for presenting them serially in the order in which they are available from said source, a random access memory for storing a plurality of signals representing characters, means for analyzing the signals presented by said FIFO memory, means responsive only to signals analyzed as representing a graphical character for storing said graphical character signals in said random access memory, a plurality of graphical character recording elements, means for effectively moving said elements along a line on said record medium, control means responsive to graphical character signals stored in said random access memory and the position of said recording elements for becoming activated to cause selected ones of said recording elements to record characters on said medium, means responsive to signals analyzed as representing a control character for executing the control function represented by said control character, means for normally disabling the presentation of new character signals by said FIFO memory, and means for enabling the presentation of new character signals by said FIFO memory comprising said means for analyzing the stored signals presented by said FIFO memory.

8. An arrangement according to claim 7 comprising erasing means responsive to activation of said control means to erase those signals stored in said random access memory responsive for activation of said control means, and said enabling means comprising said erasing means.

9. An arrangement according to claim 7 comprising indicating means for indicating the execution of said control function, and said enabling means comprising said indicating means.

10. An arrangement according to claim 9 comprising second indicating means for indicating the completion of recording along a line on said record medium, and said enabling means comprising said second indicating means.

11. In a printer wherein signals representing graphical characters and control characters are available from a source to said printer at a first rate and said printer comprises means for printing said graphical characters and means for executing the control functions represented by said control characters, a random access memory for storing available signals representing characters to be printed at column locations along a line on a record medium, first means for analyzing the signals available from said source, a plurality of character printing elements, means for presenting said elements to successive column locations along a line to be printed on said record medium, detecting means for detecting the achievement of each successive column position of said elements, means operable with said detecting means and the signals stored in said random access memory for recognizing all such graphical character signals stored in said random access memory for which character printing elements are positioned for printing and for printing the characters represented by such recognized signals, means responsive to signals analyzed as representing a control character for interrupting printing after the printable character signals previously stored in said random access memory have been printed and until said control function has been executed, means for insuring that the rate at which characters are printed by said printer is greater than the rate of availability of data from said source comprising a FIFO memory for coupling said source to said printer, said FIFO memory storing said signals representing characters available from said source and for presenting them to the printer at a substantially higher rate than said first rate in the order in which they are available from said source, the capacity of said FIFO memory is dimensioned such that when such capacity is combined with the capacity of said random access memory, sufficient aggregate storage capacity is provided to accommodate such interrupted printing and insure that all printable character signals available from said source are printed.

12. In an arrangement according to claim 11, means for maximizing the throughput of data by said printer comprising means responsive to such recognized character signals stored in said random access memory for removing them from such memory, and means responsive to removed character signals for immediately replacing them in said random access memory with new signals presented by said FIFO memory.

* * * * *